(No Model.)

A. R. SCHMIDT & J. LOWRY.
THILL COUPLING.

No. 557,707. Patented Apr. 7, 1896.

WITNESSES
W. H. Hager
S. E. Thomas

INVENTORS
Andrew R. Schmidt
John Lowry
By Charles H. Fisk.
Attorney

UNITED STATES PATENT OFFICE.

ANDREW R. SCHMIDT AND JOHN LOWRY, OF ANN ARBOR, MICHIGAN.

THILL-COUPLING.

SPECIFICATION forming part of Letters Patent No. 557,707, dated April 7, 1896.

Application filed December 9, 1892. Serial No. 454,672. (No model.)

*To all whom it may concern:*

Be it known that we, ANDREW R. SCHMIDT and JOHN LOWRY, citizens of the United States, residing at Ann Arbor, in the county of Washtenaw and State of Michigan, have invented a new and useful Shaft-Coupling for Carriages, of which the following is a specification.

Our invention relates to shaft-couplings; and it consists in an improved arrangement and construction of the several parts of what is known as the "spherical-bearing" coupling.

We are aware that a spherical bearing has been used with a spring for taking up the wear; but the devices heretofore used have been impractical and not commonly in use. By our arrangement of the parts we overcome the difficulties experienced in the efforts to use prior constructions.

Our invention is shown in the accompanying drawings, in which—

Figure 1:
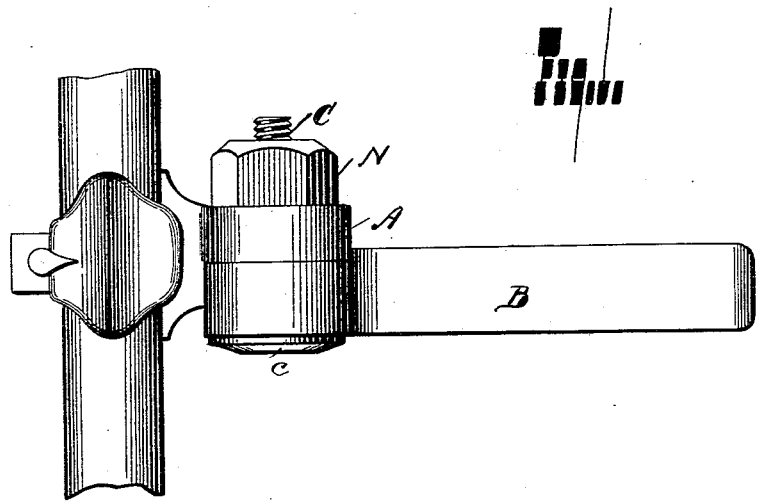
Figure 2:
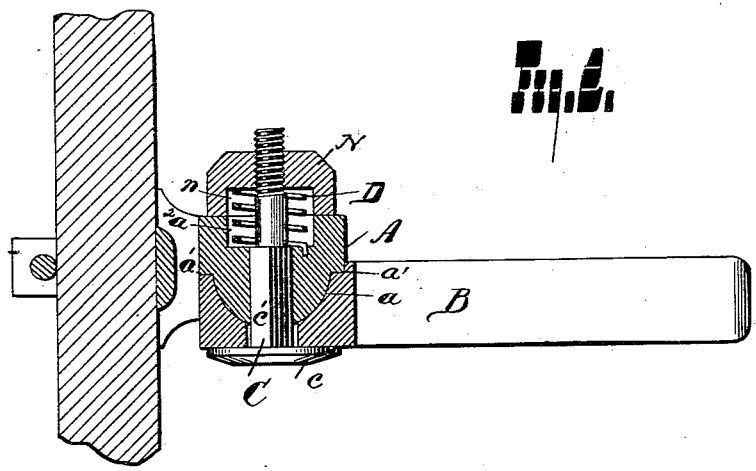

Figure 1 is a plan view of our shaft-coupling, and Fig. 2 is a horizontal section showing the relative arrangement of the parts.

In the drawings, A is the axle-iron, provided with the spherical bearing $a$ and the flat annular bearing $a'$.

B is the shaft-iron, provided with a concave bearing to fit the spherical surface $a$ and a flat annular bearing to fit the bearing $a'$.

C is a bolt having a large flat head $c$ and a square shank $c'$ to fit a square hole in the axle-iron A.

N is a nut threaded to screw onto the bolt C. The nut is provided with a recess $n$, which, in connection with the recess $a^2$ in the axle-iron, forms a chamber for the spring D, in which it is compressed and concealed between the nut and axle-iron.

By the use of the annular bearing $a$ the shaft-iron B is prevented from rolling on the spherical bearing.

One of the advantages of our construction arises from the fact that the bolt is fixed against rotation in the axle-iron. In constructions where the bolt turns, the nut will not stay on without some expensive and unsightly locking mechanism, as the action of the spring tends to work it off.

Another advantage arises from inclosing the spring in a recess partly in the axle-iron and partly in the nut. As shown in Fig. 1, the spring is entirely concealed without impairing either the axle-iron or nut.

What we claim is—

The combination of the axle-iron, the shaft-iron, a spherical bearing between the axle and shaft irons, the flat annular bearing $a$, the bolt C, fixed against rotation in the axle-iron, the nut N and the spring D, said axle-iron and nut recessed to receive and conceal the spring, substantially as described.

ANDREW R. SCHMIDT.
JOHN LOWRY.

Witnesses:
I. S. NOWLULNA,
E. E. DE FOREST.